United States Patent
Brown et al.

(10) Patent No.: US 7,269,622 B2
(45) Date of Patent: Sep. 11, 2007

(54) WATERMARKING MESSAGING SESSIONS

(75) Inventors: Michael Wayne Brown, Georgetown, TX (US); Rabindranath Dutta, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 09/915,490

(22) Filed: Jul. 26, 2001

(65) Prior Publication Data

US 2003/0023682 A1   Jan. 30, 2003

(51) Int. Cl.
*G06F 15/16* (2006.01)
*H04L 9/00* (2006.01)

(52) U.S. Cl. ............... 709/204; 709/228; 709/230; 713/176

(58) Field of Classification Search ............ 709/200, 709/204, 228, 230; 713/176
See application file for complete search history.

(56) References Cited

U.S. PATENT DOCUMENTS

| | | | | |
|---|---|---|---|---|
| 4,569,015 A * | 2/1986 | Dolev et al. | ............... | 709/201 |
| 5,828,835 A * | 10/1998 | Isfeld et al. | ............... | 709/200 |
| 6,105,012 A * | 8/2000 | Chang et al. | ............... | 705/64 |
| 6,192,396 B1 | 2/2001 | Kohler | ............... | 709/206 |
| 6,205,432 B1 | 3/2001 | Gabbard et al. | ............... | 705/14 |
| 6,330,590 B1 * | 12/2001 | Cotten | ............... | 709/206 |
| 6,341,349 B1 * | 1/2002 | Takaragi et al. | ............... | 713/168 |
| 6,356,935 B1 * | 3/2002 | Gibbs | ............... | 709/206 |
| 6,357,006 B1 * | 3/2002 | Pham et al. | ............... | 713/176 |
| 6,393,461 B1 * | 5/2002 | Okada et al. | ............... | 709/204 |
| 6,532,477 B1 * | 3/2003 | Tang et al. | ............... | 707/104.1 |
| 6,564,322 B1 * | 5/2003 | Jameson et al. | ............... | 713/176 |
| 6,606,393 B1 * | 8/2003 | Xie et al. | ............... | 382/100 |
| 6,625,734 B1 * | 9/2003 | Marvit et al. | ............... | 713/201 |
| 6,650,761 B1 * | 11/2003 | Rodriguez et al. | ............... | 382/100 |
| 6,754,822 B1 * | 6/2004 | Zhao | ............... | 713/176 |
| 6,760,443 B2 * | 7/2004 | Lacy et al. | ............... | 380/269 |
| 6,784,901 B1 * | 8/2004 | Harvey et al. | ............... | 715/757 |
| 6,785,812 B1 * | 8/2004 | Botham et al. | ............... | 713/168 |
| 6,820,202 B1 * | 11/2004 | Wheeler et al. | ............... | 713/185 |
| 6,978,293 B1 * | 12/2005 | Wong et al. | ............... | 709/206 |

OTHER PUBLICATIONS

IBM, Encrypting A Messaging Session with A symmetric Key, 50 pages, co-pending filing date Jul. 26, 2001.

(Continued)

*Primary Examiner*—Moustafa Meky
*Assistant Examiner*—Avi Gold
(74) *Attorney, Agent, or Firm*—Marilyn Smith Dawkins; Amy J. Pattillo (57) ABSTRACT

A method, system and program is provided for watermarking messaging sessions such that the origin of recorded messaging sessions is traceable. A distinguishable watermark is applied to message entries within a messaging session. The messaging entries are then recorded with the distinguishable watermark applied, such that the origin of the message entries is traceable according to the distinguishable watermark. Users participating in the messaging session receive a recording of the watermarked message entries for the messaging session, wherein user of the recording of the messaging session is traceable according to the watermark.

37 Claims, 5 Drawing Sheets

OTHER PUBLICATIONS

IBM, Notifying Users When Messaging Sessions Are Recorded, 47 pages, co-pending filing date Jul. 26, 2001.

IBM, Editing Messaging Session For A Record, 40 pages, co-pending filing date Jul. 26, 2001.

IBM, Sharing Messaging Device Infomation Among Network Users, 47 pages, co-pending filing date Jul. 26, 2001.

IBM, Individually Specifying Message Output Attributes in A Messaging System, 65 pages, co-pending filing date Jul. 26, 2001.

IBM, Verifying Messaging Sessions By Digital Signatures of Participants, 46 pages, co-pending filing date Jul. 26, 2001.

IBM, Specifying Messaging Session Subject Preferences, 42 pages, co-pending filing date Jul. 26, 2001.

* cited by examiner

WATERMARKING MESSAGING SESSIONS

CROSS-REFERENCE TO RELATED APPLICATIONS

The present application is related to the following co-pending applications, which are filed on even date herewith and incorporated herein by reference:
(1) U.S. patent application Ser. No. 09/915,974,
(2) U.S. patent application Ser. No. 09/915,540,
(3) U.S. patent application Ser. No. 09/915,465,
(4) U.S. patent application Ser. No. 09/915,458,
(5) U.S. patent application Ser. No. 09/915,995, now abandoned;
(6) U.S. patent application Ser. No. 09/915,551, now abandoned;
(7) U.S. patent application Ser. No. 09/915,450, now abandoned.

BACKGROUND OF THE INVENTION

1. Technical Field

The present invention relates in general to electronic communications and, in particular, to recording messaging sessions. Still more particularly, the present invention relates to watermarking messaging sessions such that the origin of messaging session log files is traceable and the integrity of messaging session log files is verifiable.

2. Description of the Related Art

As the Internet and telephony expand, the ease of communications between individuals in different locations continues to expand as well. One type of electronic communication is supported by messaging which includes the use of computer systems and data communication equipment to convey messages from one person to another, as by e-mail, voice mail, instant voice communications, instant text messaging, or fax.

While e-mail has already expanded into nearly every facet of the business world, other types of messaging continue to forge into use. For example, instant messaging systems are typically utilized in the context of an Internet-supported application that transfers text between multiple Internet users in real time.

In particular, the Internet Relay Chat (IRC) service is one example of instant messaging that enables an Internet user to participate in an on-line conversation in real time with other users. An IRC channel, maintained by an IRC server, transmits the text typed by each user who has joined the channel to the other users who have joined the channel. An IRC client shows the names of the currently active channels, enables the user to join a channel, and then displays the other channel participant's words on individual lines so that the user can respond.

Similar to IRC, chat rooms are often available through on-line services and provide a data communication channel that links computers and permits users to converse by sending text messages to one another in real-time.

However, messaging systems, including instant messaging, are limited in that when information entered in a messaging session is released in an unauthorized way, it is often difficult to determine which user released the information from the messaging session when there are more than two participants in the session. In addition, in a more general way, messaging systems are limited in that the origin of a messaging session cannot be traced after a recording of the messaging session is transmitted to multiple users.

In view of the foregoing, it would be advantageous to provide a method, system and program for identifying recordings of messaging sessions such that the origin of the recording is traceable.

SUMMARY OF THE INVENTION

In view of the foregoing, it is therefore an object of the present invention to provide an improved method, system and program for performing electronic communications.

It is another object of the present invention to provide a method, system and program for recording messaging sessions.

It is yet another object of the present invention to provide a method, system and program for watermarking messaging sessions such that the origin of messaging session log files is traceable and the integrity of messaging session log files is verifiable.

According to one aspect of the present invention, a distinguishable watermark is applied to message entries within a messaging session. The messaging entries are then recorded with the distinguishable watermark applied, such that the origin of the message entries is traceable according to the distinguishable watermark.

According to another aspect of the present invention, a user participates in a messaging session by receiving messaging entries from other users participating in the messaging session. In addition, the user receives a recording of the messaging session, wherein the message entries for the messaging session are watermarked, such that use of the recording of the messaging session is traceable according to the watermark. Further, the user may request to watermark the message entries through a client messaging system as the message entries are received.

According to yet another aspect of the present invention, a new message entry is detected at a client messaging system entered by a user. A watermark is applied to the new message entry prior to transmission for distribution within a messaging session, such that an origin of said the new message entry is traceable to the client messaging system.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

A method, system and program are depicted for watermarking messaging sessions such that the origin of recordings of messaging sessions is traceable and the integrity of recordings of messaging sessions is verifiable.

A "messaging session" preferably includes multiple message entries that include, but are not limited to, any combination of voice, graphical, video, and/or text messages, instant and/or delayed, transmitted between multiple users via a network. Messaging sessions may include use of chat rooms, instant messages, e-mail, IRC, conference calling and other network methods of providing a channel for users to communicate within. Further, messaging sessions may include communications such as voice, video, and text transmissions between multiple telephony devices.

"Watermarking" may include modifying the text, graphics, video, or audio included in a messaging session in a way such that the origin of the messaging session is traceable and the integrity of the messaging session is later verifiable. Preferably, the modification to the text, graphics or audio is made in such a manner that the modification is not discernable to users participating in the messaging session, however modifications are not limited to those that are not discernable. In addition, a trace logger may be attached with the watermark such that the path of a watermarked message entry or messaging session may be traced when recovered. Further, the trace logger may transmit information back to a messaging server or other central repository indicating the path of the watermarked message entry or messaging session.

In particular, watermarking may include visible and invisible markings that are laid over the original messaging session recording. Visible watermarking may include adjustments to text, graphics, video or audio that are visible, such as a visible translucent images laid over the original messaging session. Invisible watermarking may include an image overlaid on the original messaging session recorded that is not visible, but may be detected algorithmically. In particular, an invisible watermark may be applied, such that any adjustment to the recorded messaging session destroys the watermark and therefore, if a watermark is intact when tested, then the recorded messaging session has not been tampered. In addition, a watermark may be applied that does not allow adjustments to a messaging session such that the origin of the messaging session can be easily verified utilizing the invisible watermark.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

The present invention may be executed in a variety of systems, including a variety of computing systems and electronic devices under a number of different operating systems. In one embodiment of the present invention, the messaging system is a portable computing system such as a notebook computer, a palmtop computer, a personal digital assistant, a telephone or other electronic computing system that may also incorporate communications features that provide for telephony, enhanced telephony, messaging and information services. However, the messaging system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Figures 1, 6:
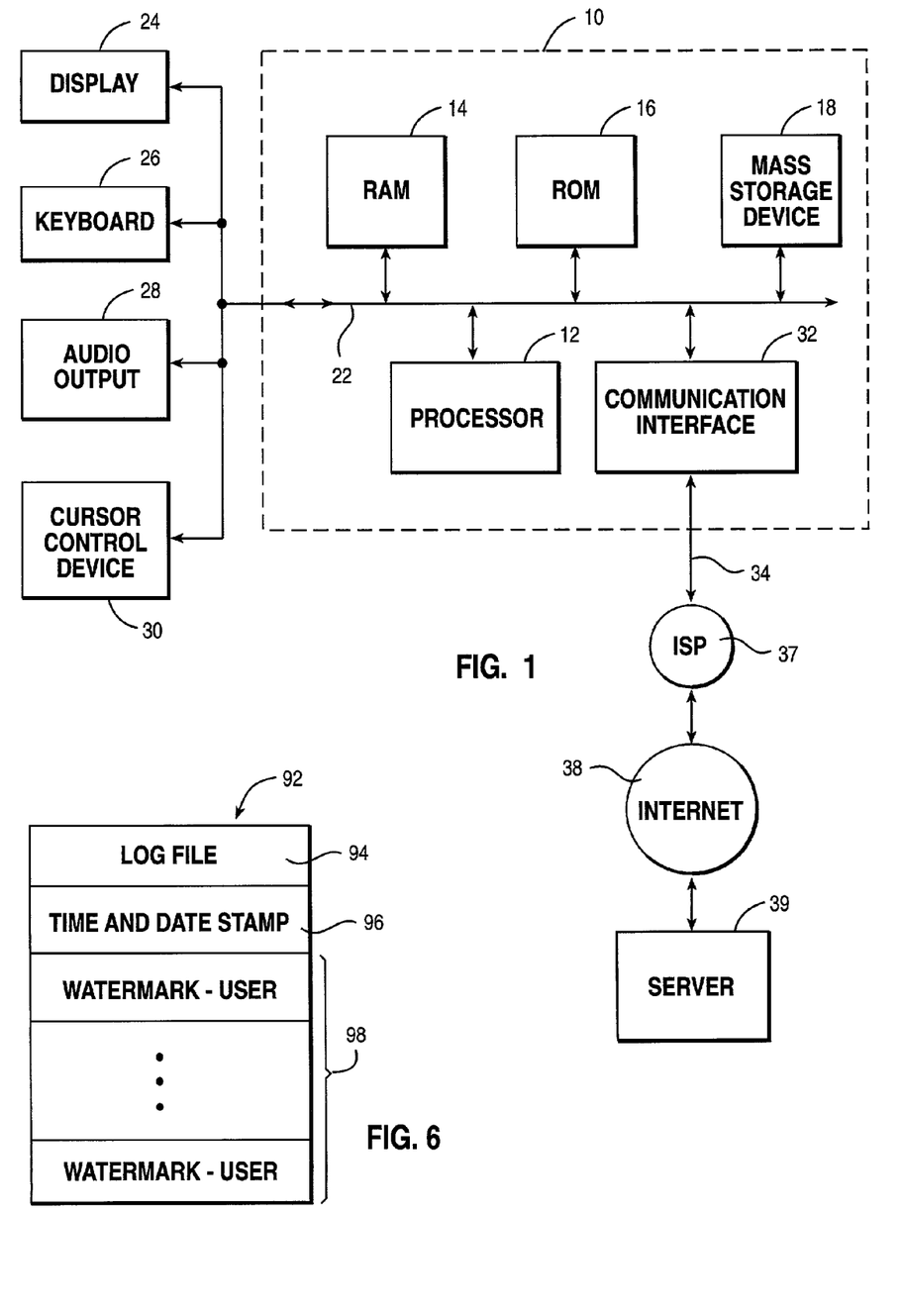
FIG. 1 depicts one embodiment of a computer system with which the method, system and program of the present invention may advantageously be utilized.
FIG. 6 illustrates a block diagram of a recorded messaging session in accordance with the method, system, and program of the present invention.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 7, 8, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patters of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of non-volatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. A keyboard 26 and cursor control device 30, such as a mouse, trackball, or cursor direction keys, are coupled to bus 22 as interfaces for user inputs to computer system 10. In alternate embodiments of the present invention, additional input and output peripheral components may be added.

Messaging Systems Context

Figure 2:
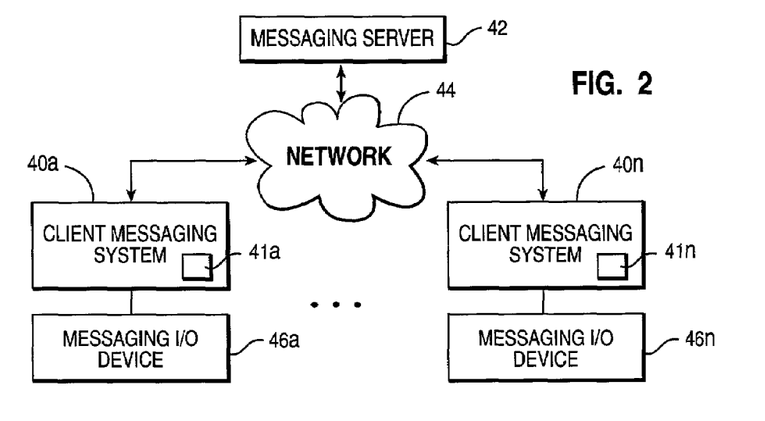
FIG. 2 illustrates a simplified block diagram of a client/server environment in which electronic messaging typically takes place in accordance with the method, system and program of the present invention.

With reference now to FIG. 2, there is depicted a simplified block diagram of a client/server environment in which electronic messaging typically takes place in accordance with the method, system and program of the present invention. The client/server environment is implemented within multiple network architectures. For example, the architecture of the World Wide Web (the Web) follows a traditional client/server modeled environment.

The terms "client" and "server" are used to refer to a computer's general role as a requester of data (the client) or provider of data (the server). In the Web environment, web browsers such as Netscape Navigator typically reside on client messaging systems 40a-40n and render Web documents (pages) served by at least one messaging server such as messaging server 42. Additionally, each of client messaging systems 40a-40n and messaging server 42 may function as both a "client" and a "server" and may be implemented utilizing a computer system such as computer system 10 of FIG. 1. Further, while the present invention is described with emphasis upon messaging server 42 controlling a messaging session, the present invention may also be performed by client messaging systems 40a-40n engaged in peer-to-peer network communications via a network 44.

The Web may refer to the total set of interlinked hypertext documents residing on servers all around the world. Network 44, such as the Internet, provides an infrastructure for transmitting these hypertext documents between client messaging systems 40a-40n and messaging server 42. Documents (pages) on the Web may be written in multiple languages, such as Hypertext Markup Language (HTML) or Extensible Markup Language (XML), and identified by Uniform Resource Indicators (URIs) that specify the particular messaging server 42 and pathname by which a file can be accessed, and then transmitted from messaging server 42 to an end user utilizing a protocol such as Hypertext Transfer Protocol (HTTP). Web pages may further include text, graphic images, movie files, and sounds as well as Java applets and other small embedded software programs that execute when the user activates them by clicking on a link.

Advantageously, in the present invention, a client enters a message via one of messaging input/output (I/O) devices 46a-46n for a messaging session at a client messaging system such as client messaging system 40a. The message entry is transmitted to messaging server 42. Messaging server 42 then distributes the message entry to the users participating in the messaging session via network 44.

In addition, in the present invention, as message entries are distributed by messaging server 42, a watermark may be applied to each message entry or to a selection of message entries. In particular, watermarking may be applied to message entries according to user, according to group or a single watermark applied for the messaging session. Users may or may not be aware that watermarking is being applied by messaging server 42. Alternatively, each of client messaging systems 40a- 40n may apply a watermark to message entries when received from messaging server 42. Or, as another alternative, each of client messaging systems 40a-40n may apply a watermark to message entries before transmitting the message entries to messaging server 42 for distribution in the messaging session. Further, watermarking may be applied to message entries independent of whether those message entries are being recorded.

In the present embodiment messaging server 42 may handle transmission of message entries, recording of messaging sessions and transmission of watermarked recorded messaging sessions among users; in alternate embodiments, watermarked recorded messaging sessions may be accessible to client messaging systems 40a-40n as files in a directory that is accessible to a user. In addition, the watermarked recorded messaging sessions may be transmitted as e-mail to participants in the messaging session. Moreover, the present invention may utilize a traditional IRC channel for transmitting message entries and special IRC device channels opened in parallel with the traditional IRC channel for distributing watermarked recorded messaging sessions among users and for controlling verification requests. Furthermore, other types of messaging systems may be utilized to implement the present invention, as will be understood by one skilled in the art.

Advantageously, the steps of requesting to record, requesting to stop recording and other functions are performed by an application executing in each of client messaging systems 40a-40n, such as client recording applications 41a-41n. In addition, the step of adding a watermark to a message entry or to a recording of message entries may be performed by client recording applications 41a-41n.

Figure 3:
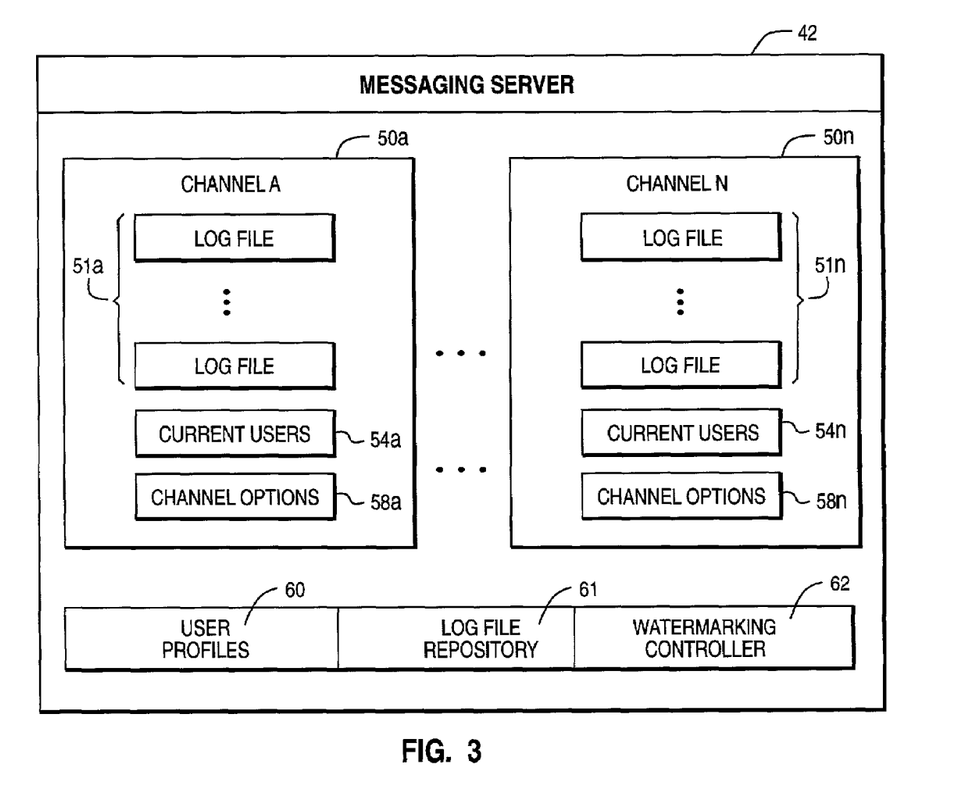
FIG. 3 depicts a block diagram of one embodiment of a messaging server in accordance with the method, system and program of the present invention.

Referring now to FIG. 3, there is illustrated a block diagram of one embodiment of a messaging server in accordance with the method, system and program of the present invention. As depicted messaging server 42 includes a watermarking controller 62 that is provided to control the process steps of messaging server 42 as will be further described.

Messaging server 42 also includes multiple channels 52a-52n. Each of channels 52a-52n may represent a separate information path within messaging server 42 in which multiple users may participate in a messaging session. Messaging server 42 may have a defined number of channels 52a-52n or may allow users to create new channels as needed. In particular, channels provide network paths between multiple users for both voice and text communications. Each of channels 52a-52n may further include multiple distinguishable topics.

In addition, each of channels 52a-52n preferably includes a table of current users 54a-54n. As a user selects to participate in channels 52a-52n, the user's identification is added to the table of current users 54a-54n for that channel.

Preferably, as messaging server 42 receives messages, they may be stored according to the channel, topic and user and then distributed to each of the users participating in that channel. Where both voice and text are being utilized in a single messaging session, messaging server 42 may transmit both voice and text or messaging server 42 may translate all entries into either voice or text before distributing entries to the users participating in the channel.

Messaging entries are preferably stored within each channel in one of log files 51a-51n. Advantageously, multiple users may request to record different selections of the message entries for a messaging session where a new log file is utilized for each request. For example, one user may request to record message entries from a selection of users from among all the users while another user may request to record message entries during a particular time interval of the messaging session.

When a user has finished recording the desired portions of a messaging session, the log file for that user may be stored in a log file repository 61. Advantageously, log file repository 61 catalogs messaging session recordings such that multiple users may easily access the recordings. While in the present invention log file repository 61 is depicted within messaging server 42, in alternate embodiments log file repository 61 may be included in an alternate server system. In addition, alternatively, log files may be transmitted from messaging server 42 to client messaging systems for storage.

Messaging server 42 includes a user profiles database 60 that includes profile information for each user, including, but not limited to, a user identification, a name, an e-mail address, and a user history recorded as the user participates in messaging sessions. The user identification stored in user profiles 60 during registration is utilized across multiple channels for identifying entries provided by that user.

Watermarking controller 62 is advantageously a software application executing within messaging server 42 which controls the application of watermarking to message entries according to channel options, user preferences and other settings. Advantageously, watermarking controller 62 controls the application of watermarking to message entries in real-time and storage of the watermarked message entries. However, watermarking controller 62 may also apply watermarking to message entries in real-time without recording the message entries.

In addition, watermarking controller 62 may further trace the origin of watermarked messaging sessions and verify the integrity thereof. Further, watermarking controller 62, may trace the path of a watermarked messaging session or message entry.

Channel options are included with each channel as depicted by channel options 58a-58n. Channel options preferably include preferences for applying watermarking to a channel. Advantageously, channel options may be selected when a user requests a new channel. Or, alternatively, a user may select a channel based on the watermarking designation for that channel. Further, a business providing messaging server 42 may set channel options 58a-58n where watermarking is added without user knowledge.

In particular, channel options may designate to add watermarking to message entries as they are distributed from messaging server 42 or to add watermarking to log files before they are distributed to users participating in the messaging session. Additionally, channel options may designate to distinguish watermarking according to user or may apply a single watermark to a messaging session.

Figure 4:
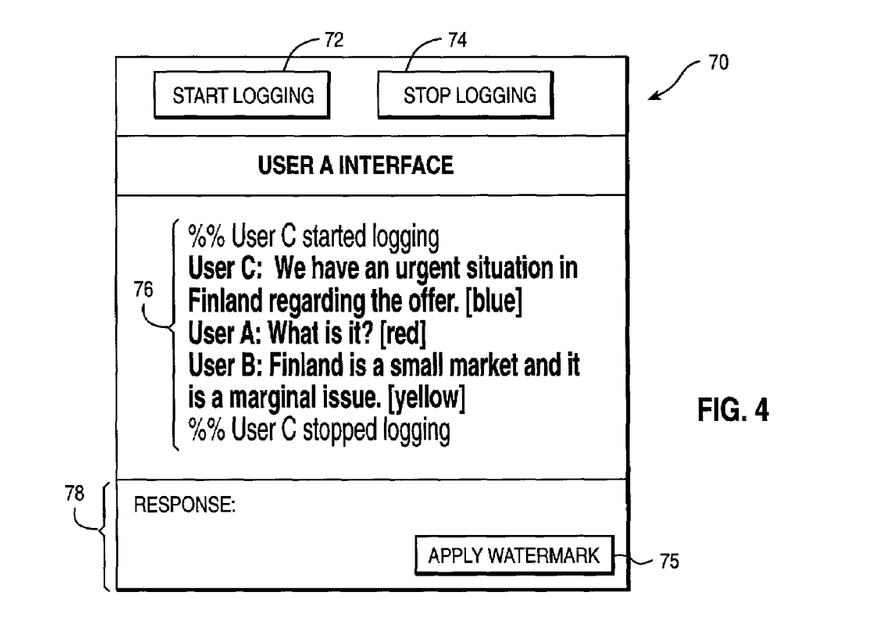
FIG. 4 illustrates a graphical representation of a messaging session window in accordance with the method, system and program of the present invention.

With reference now to FIG. 4, there is illustrated a graphical representation of a messaging session window in accordance with the method, system and program of the present invention. As depicted, a messaging session interface 70 is depicted for user A.

Messaging session interface 70 illustrates selectable buttons 72 and 74. Upon a user selection of selectable button 72, a request to log the messaging session is transmitted to a messaging server. Upon a user selection of selectable button 74, a request to stop logging the messaging session is transmitted to the messaging server.

Next, messaging session interface 70 further depicts multiple message entries 76. Message entries 76 includes both messages posted by users participating in the messaging session and textual indicators of actions taken by participants in the messaging session. For example, textual indicators are provided in message entries 76 when user C started logging and stopped logging the messaging session.

In particular, the present example depicts message entries 76 without any watermarking applied by the messaging server or the client messaging system. However, in alternate embodiments, watermarking may be applied to message entries 76 by the messaging server or the client messaging system.

Further, a response block 78 is illustrated within messaging session interface 70. Response block 78 is provided to allow a user to enter either a textual or vocal message to be included in the messaging session.

Additionally, messaging session interface 70 illustrates a selectable button 75. In response to a user selection of selectable button 75, the user is preferably further given an option to watermark individual message entries prior to transmission or to watermark message entries that have been received. With either selection, the client messaging system preferably adds watermarking to the designated message entry. In particular, it may be advantageous for a user to select to watermark message entries that have been received such that if those message entries are obtained from the user in an unauthorized manner, the origin of the user from whom the message entries were obtained may be traced and verified. In particular, a watermark that also traces a path for the message entries may be advantageous.

Figure 5:
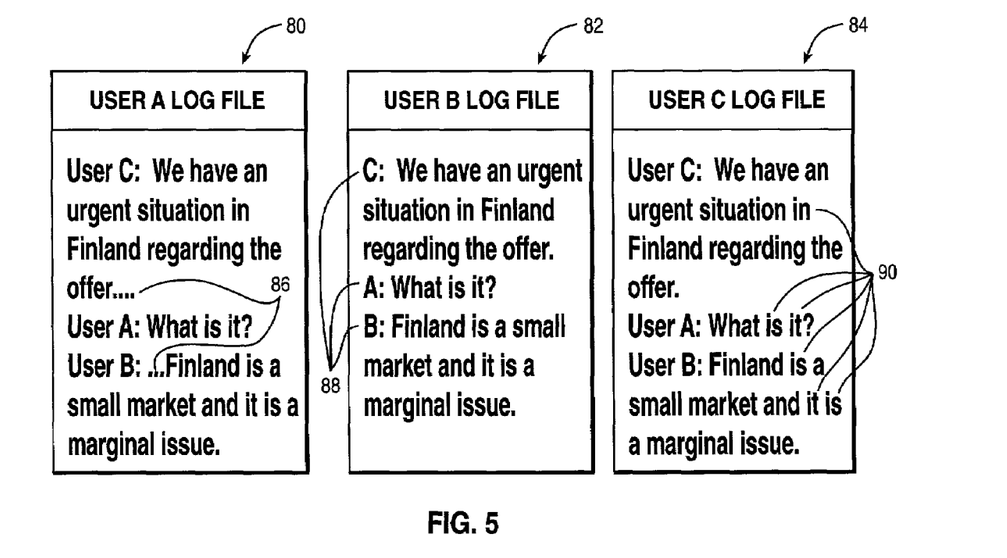
FIG. 5 depicts a graphical representation of multiple log files watermarked according to the user in accordance with the method, system and program of the present invention.

Referring now to FIG. 5, there is depicted a graphical representation of multiple log files watermarked according to the user in accordance with the method, system and program of the present invention. As illustrated, log files 80, 82, and 84 are each associated with a user. In the example, log file 80 is associated with user A, log file 82 is associated with user B, and log file 84 is associated with user C.

In the present example, each of log files 80, 82, and 84 have been distinguishably visibly watermarked in association with a user prior to distributing the log files to the associated users. By watermarking each of log files 80, 82, and 84 prior to distribution to the associated users, the origin of the information in the log files can be traced if necessary. As previously described, it might be advantageous to trace the origin of information released from a log file if such information was released as a breach of confidentiality.

In particular, in comparing message entries 76 of FIG. 4 with log files 80, 82, and 84, the watermarking applied to each log file is distinguishable. In log file 80, additional punctuation has been applied as watermarking in the form of dot leaders as depicted by an indicator 86. In log file 82, the identifier for each user has been shortened in a uniform manner as watermarking as illustrated by an indicator 88. In log file 84, where words start with the letter "i" they are capitalized as a watermark as illustrated at indicator 90. While in each of log files 80, 82 and 84 textual watermarking is applied, in alternate embodiments, graphical and audio watermarking may be applied as well. Moreover, while in log files 80, 82, and 84, visible textual watermarking is applied, in alternate embodiments, invisible watermarking may be applied.

Referring now to FIG. 6, there is depicted a block diagram of a recorded messaging session in accordance with the method, system, and program of the present invention. As illustrated, a messaging session recording 92 includes a log file 94, a time and date stamp 96, and multiple watermarks 98 stored according to user. Log file 94 preferably includes the original recording of a messaging session with time and data stamp 96 indicating the time and date of recording.

Watermarks 98 may include, but are not limited to, each watermarked file as transmitted to a user, an algorithm utilized to create each watermark, or a visible or invisible image overlaid on the original log file 94. In addition, alternate types of watermarking may be utilized and recorded in watermarks 98. Further, watermarks may be stored according to groups or a single watermark may be utilized for a single recording.

In particular, in response to a user request to trace the origin of a messaging session recording or to verify the integrity of a recording, a messaging server or other device utilized to trace the origin of the recording or verify the integrity thereof advantageously accesses messaging session recording 92.

Figure 7:
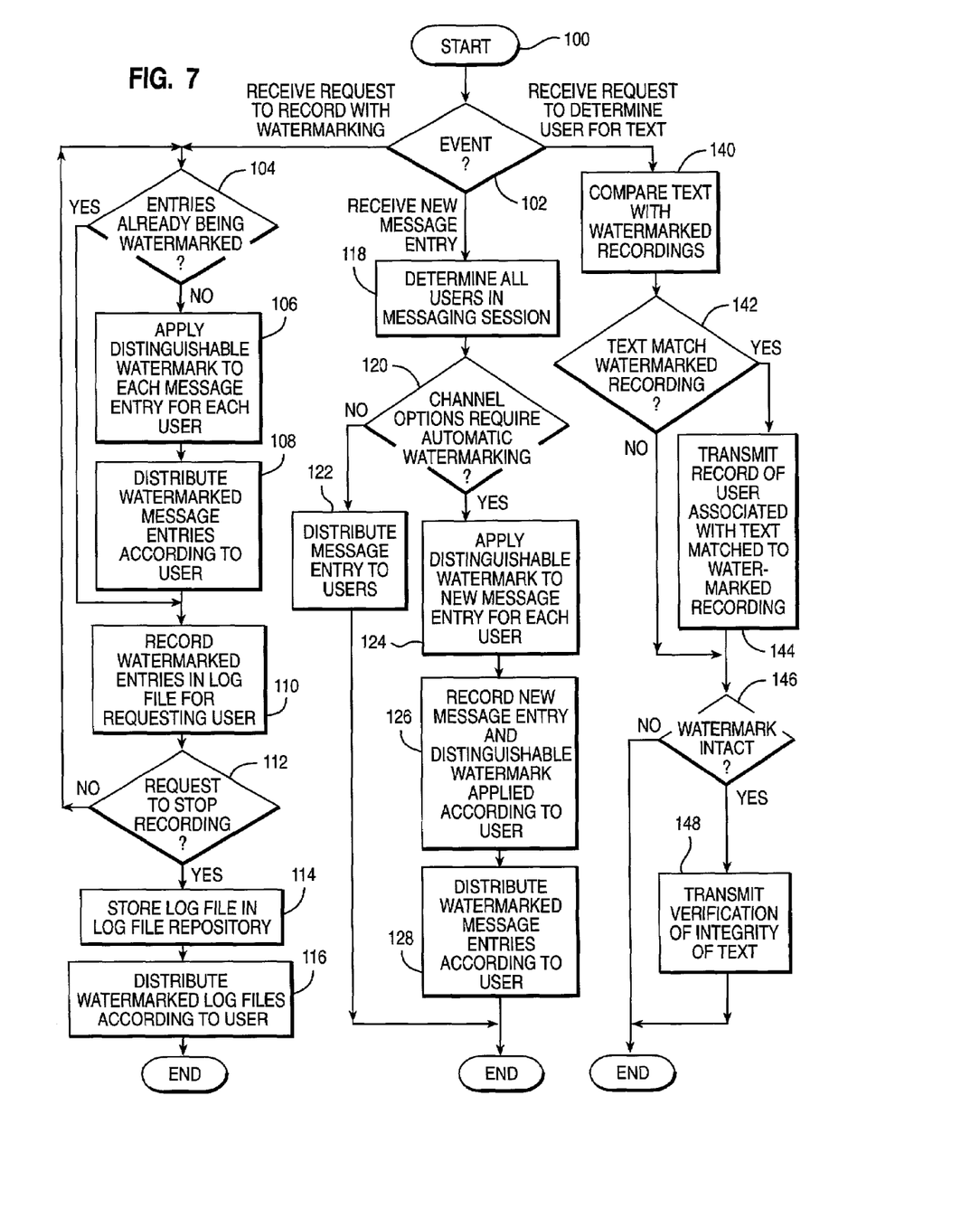
FIG. 7 depicts a high level logic flowchart of a process and program for recording watermarks and tracing the origin of watermarked text in accordance with the method, system, and program of the present invention.

With reference now to FIG. 7, there is illustrated a high level logic flowchart of a process and program for recording watermarks and tracing the origin of watermarked text in accordance with the method, system, and program of the present invention. As depicted, the process starts at block 100 and thereafter proceeds to block 102. Block 102 illustrates a determination as to which event occurred when an event occurs. If a request to record with watermarking is received, then the process passes to block 104. If a new message entry is received, then the process passes to block 118. Or, if a request to determine the user associated with a particular text is received, then the process passes to block 140.

Block 104 depicts a determination as to whether or not entries are already being watermarked. If entries are already being watermarked through another recording or by automatic watermarking according to the channel options, then the process passes to block 110. If entries are not already being watermarked, then the process passes to block 106.

Block 106 illustrates applying a distinguishable watermark to each message entry for each user participating in the messaging session. Next, block 108 depicts distributing the watermarked message entries according to user and the process passes to block 110.

Block 110 depicts recording the watermarked entries in a log file for the requesting user. Next, block 112 illustrates a determination as to whether or not a request to stop recording is received. If a request to stop recording is not received, then the process passes to block 104. If a request to stop recording is received, then the process passes to block 114.

Block 114 illustrates storing the log file with watermarks in a log file repository according to a user. Next, block 116 depicts distributing the watermarked log files according to user and the process ends.

Block 118 depicts determining all the users in a messaging session. Next, block 120 illustrates a determination as to whether or not channel options require automatic watermarking. In particular, channel options for a messaging session may be designated such that watermarking is automatically applied in a specified way. For example, channel options may specify watermarking each message entry with a distinguishable watermark for each user. Another channel option may specify only applying watermarking to message entries received from or transmitted to particular users. If channel options require automatic watermarking, then the process passes to block 124. If channel options do not require automatic watermarking, then the process passes to block 122. Block 122 depicts distributing the message entries to the users participating in the session and the process ends.

Block 124 illustrates applying a distinguishable watermark to the new message entry for each user. Next, block 126 depicts recording the new message entry and distinguishable watermark applied according to user. Thereafter, block 128 illustrates distributing the watermarked message entry according to user and the process ends.

Block 140 depicts comparing the text, audio, or graphic received with watermarked recordings. Next, block 142 illustrates a determination as to whether the text, audio, or graphic matches any watermarked recording. If there is not a match, then the process passes to block 146. If there is a match, then the process passes to block 144. Block 144 depicts transmitting a record of the user or users associated with the text, audio, or graphic matched to the watermarked recording and the process passes to block 146.

Block 146 illustrates a determination as to whether or not the watermark attached to the log file is still intact. If the watermark is no longer intact, then the process ends. In addition, an output may be transmitted indicating that the log file has been tampered. If the watermark is still intact, then the process passes to block 148. Block 148 depicts transmitting a verification of the integrity of the log file, and the process ends.

Figure 8:
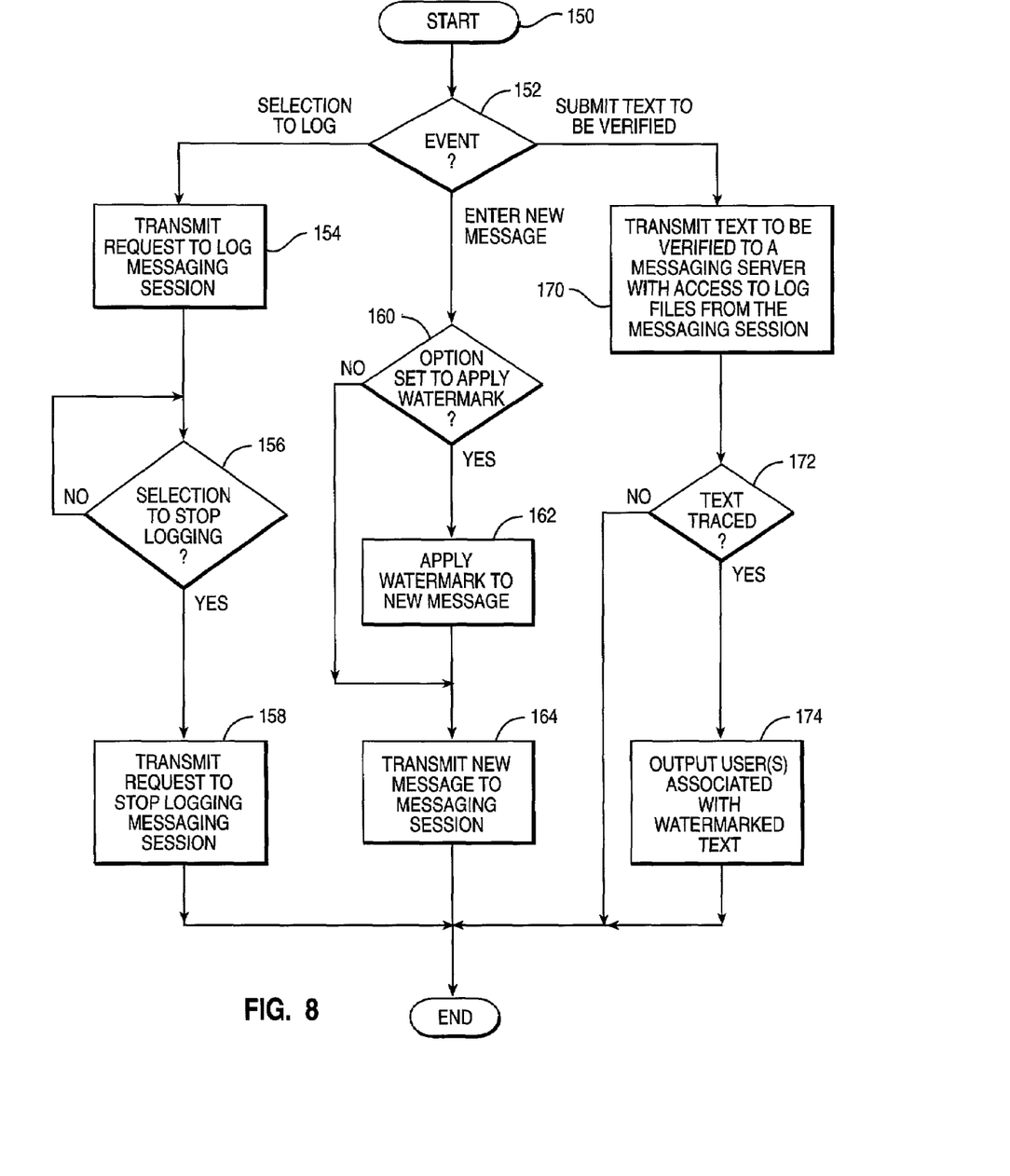
FIG. 8 illustrates a high level logic flowchart of a process and program for controlling a client messaging system in accordance with the method, system, and program of the present invention.

Referring now to FIG. 8, there is illustrated a high level logic flowchart of a process and program for controlling a client messaging system in accordance with the method, system, and program of the present invention. As depicted, the process starts at block 150 and thereafter proceeds to block 152. Block 152 illustrates a determination as to which event occurred when an event occurs. If a selection to log a messaging session is detected, then the process passes to block 154. If a new message is entered, then the process passes to block 160. Or, if a submission of text to verify the user is received, then the process passes to block 170.

Block 154 depicts transmitting a request to log the messaging session to the messaging server. Next, block 156 illustrates a determination as to whether or not a selection to stop logging is detected. If a selection to stop logging is not received, then the process iterates at block 156 until the messaging session has concluded. If a selection to stop logging is detected, then the process passes to block 158. Block 158 depicts transmitting a request to stop logging the messaging session to the messaging server and the process ends.

Block 160 illustrates a determination as to whether or not an option is set to apply a watermark. If an option is not set to apply a watermark, then the process passes to block 164. If an option is set to apply a watermark, then the process passes to block 162. Block 162 depicts applying a watermark to the new message. Next, block 164 illustrates transmitting the new message to the messaging server and the process ends.

Block 170 depicts transmitting text to a messaging server with access to a log file repository containing the text. Next, block 172 illustrates a determination as to whether the watermarked text is traced to the originating user. If the text is not traced to the originating user, then the process ends. If the text is traced to the originating user, then the process passes to block 174. Block 174 depicts outputting the record of the user or users associated with the watermarked text and the process ends.

While the invention has been particularly shown and described with reference to a preferred embodiment, it will be understood by those skilled in the art that various changes in form and detail may be made therein without departing from the spirit and scope of the invention.

What is claimed is:

1. A method, in at least one server system for enabling at least one real time chat messaging session channel via a network between at least a selection of a plurality of separate client systems communicatively connected to said network, for recording a real time chat messaging session, said method comprising the steps of:

applying, at said at least one server system, a separate distinguishable digital watermark to each of a plurality of message entries communicated within said chat messaging session between said selection of said plurality of separate client systems, wherein each said separate distinguishable digital watermark identifies a separate origin of said message entry from among said plurality of separate client systems; and recording, at said at least one server system, a log of said chat messaging session, wherein said log comprises said plurality of messaging entries with each said separate distinguishable watermark applied, such that an origin of each of said plurality of message entries stored in said log is traceable and the integrity of each of said plurality of message entries stored in said log is verifiable according to said distinguishable watermark.

2. The method for recording a chat messaging session according to claim 1, said method further comprising the step of:

applying each said separate distinguishable digital watermark and recording said log of said chat messaging session with said plurality of messaging entries at a particular client system from among said plurality of client systems.

3. The method for recording a chat messaging session according to claim 1, said step of applying, at said at least one server system, a separate distinguishable digital watermark further comprising the step of:

applying, at said at least one server system, a separate textual watermark to each of said plurality of message entries within said chat messaging session.

4. The method for recording a chat messaging session according to claim 1, said step of applying, at said at least one server system, a separate distinguishable digital watermark further comprising the step of:

applying, at said at least one server system, a separate graphical watermark to each of said plurality of message entries within said chat messaging session.

5. The method for recording a chat messaging session according to claim 1, said step of applying, at said at least one server system, a separate distinguishable digital watermark further comprising the step of:

applying, at said at least one server system, a separate audible watermark to each of said plurality of message entries within said chat messaging session.

6. The method for recording a chat messaging session according to claim 1, said method further comprising the step of:

transmitting said log of said chat messaging session to a plurality of users participating in said chat messaging session.

7. The method for recording a chat messaging session according to claim 1, said method further comprising the step of:

storing said log of said chat messaging session in a log file repository for tracing said origin of said plurality of message entries according to each said separate distinguishable watermark.

8. The method for recording a chat messaging session according to claim 1, said method further comprising the step of:

applying each said separate distinguishable digital watermark in response to a user request received from at least one from among said plurality of client systems to record said plurality of messaging entries with watermarking.

9. The method for recording a chat messaging session according to claim 1, said method further comprising the step of:

applying said distinguishable watermark to a plurality of message entries already recorded in a second log of said chat messaging session.

10. A system for recording a chat messaging session, said system comprising:

a messaging server communicatively connected to a network, said messaging server for enabling at least one real time chat messaging session channel via said network between at least a selection of a plurality of separate client systems communicatively connected to said network to facilitate said chat messaging session; said messaging server further comprising:

means for applying a separate distinguishable digital watermark to each of a plurality of message entries communicated within said chat messaging session, wherein each said separate distinguishable digital watermark identifies a separate origin of said message entry from among said plurality of separate client systems; and means for recording a log of said chat messaging session, wherein said log comprises said plurality of messaging entries with each said separate distinguishable watermark applied, such that an origin of each of said plurality of message entries stored in said log is traceable and the integrity of each of said plurality of message entries stored in said log is verifiable according to said distinguishable watermark.

11. The system for recording a chat messaging session according to claim 10, said means for applying a separate distinguishable digital watermark further comprising:
means for applying a separate textual watermark to each of said plurality of message entries within said chat messaging session.

12. The system for recording a chat messaging session according to claim 10, said means for applying a separate distinguishable digital watermark further comprising:
means for applying a separate graphical watermark to each of said plurality of message entries within said chat messaging session.

13. The system for recording a chat messaging session according to claim 10, said means for applying a separate distinguishable digital watermark further comprising:
means for applying a separate audible watermark to each of said plurality of message entries within said chat messaging session.

14. The system for recording a chat messaging session according to claim 10, said messaging server further comprising:
means for transmitting said log of said chat messaging session to a plurality of users participating in said chat messaging session.

15. The system for recording a chat messaging session according to claim 10, said messaging server further comprising:
means for storing said log of said chat messaging session in a log file repository for tracing said origin of said plurality of message entries according to each said separate distinguishable watermark.

16. The system for recording a chat messaging session according to claim 10, said messaging server further comprising:
means for applying each said separate distinguishable digital watermark in response to a user request received from at least one from among said plurality of client systems to record said plurality of messaging entries with watermarking.

17. The system for recording a chat messaging session according to claim 10, said messaging server further comprising:
means for applying said distinguishable watermark to a plurality of message entries already recorded in a second log of said chat messaging session.

18. A program for recording a chat messaging session, residing on a computer usable medium having computer readable program code means, said program comprising:
means for enabling at least one server system to facilitate at least one real time chat messaging session channel via a network between at least a selection of a plurality of separate client systems communicatively connected to said network to facilitate said chat messaging session;
means for controlling application, at said at least one server system, of a separate distinguishable digital watermark to each of a plurality of message entries communicated within said chat messaging session, wherein each said separate distinguishable digital watermark identifies a separate origin of said message entry from among said plurality of separate client systems; and
means for controlling recording of a log of said chat messaging session, at said at least one server system, wherein said log comprises said plurality of messaging entries with each said separate distinguishable watermark applied, such that an origin of each of said plurality of message entries stored in said log is traceable and the integrity of each of said plurality of message entries stored in said log is verifiable according to said distinguishable watermark.

19. The program for recording a chat messaging session according to claim 18, said means for controlling application, at said at least one server system, of a separate distinguishable digital watermark further comprising:
means for controlling application of a separate textual watermark to each of said plurality of message entries within said chat messaging session.

20. The program for recording a chat messaging session according to claim 18, said means for controlling application, at said at least one server system, of a separate distinguishable digital watermark further comprising:
means for controlling application of a separate graphical watermark to each of said plurality of message entries within said chat messaging session.

21. The program for recording a chat messaging session according to claim 18, said means for controlling application, at said at least one server system, of a separate distinguishable digital watermark further comprising:
means for controlling application of a separate audible watermark to each of said plurality of message entries within said chat messaging session.

22. The program for recording a chat messaging session according to claim 18, said program further comprising:
means for enabling transmission of said log of said chat messaging session to a plurality of users participating in said chat messaging session.

23. The program for recording a chat messaging session according to claim 18, said program further comprising:
means for directing storage of said log of said chat messaging session in a log file repository for tracing said origin of said plurality of message entries according to each said separate distinguishable watermark.

24. The program for recording a chat messaging session according to claim 18, said program further comprising:
means for controlling application of each said separate distinguishable digital watermark in response to a user request received from at least one from among said plurality of client systems to record said plurality of messaging entries with watermarking.

25. The program for recording a chat messaging session according to claim 18, said program further comprising:
means for controlling application of said distinguishable watermark to a plurality of message entries already recorded in a second log of said chat messaging session.

26. A method, in a particular client system from among a plurality of clients systems enabled to communicate with one another through a chat messaging session channel facilitated by a chat messaging server via a network, for participating in a chat messaging session facilitated through said chat messaging session channel, said method comprising the steps of:
participating at said particular client system in a chat messaging session by receiving from said chat messaging server a plurality of messaging entries as each messaging entry is entered by separate ones of a plurality of separate users participating in said chat messaging session through separate ones of said plurality of client systems; and
receiving, at said particular client system separate from participating in said chat messaging session, a recording of said chat messaging session from said chat messaging server, wherein said plurality of message entries for said chat messaging session are each embedded by a separate digital watermark, wherein each said separate digital watermark identifies a separate origin of each of said plurality of message entries from among separate ones of said plurality of client systems, such that use of said recording of said chat messaging session is traceable according to a watermark.

27. The method for participating in a chat messaging session according to claim 26, said method further comprising the step of:
   requesting, from said chat messaging server, said recording of said chat messaging session with each of said plurality of entries embedded by said separate digital watermark.

28. The method for participating in a chat messaging session according to claim 26, said method further comprising the step of:
   participating in said chat messaging session by entering a messaging entry for distribution by said chat messaging server to said plurality of client systems through said chat messaging session channel.

29. The method for participating in a chat messaging session according to claim 26, said method further comprising the step of:
   participating in said chat messaging session by entering watermarked message entries for distribution by said chat messaging server to said plurality of client systems participating in said chat messaging session.

30. A system for participating in a chat messaging session, said system comprising:
   a particular client messaging system from among a plurality of client systems communicatively connected to a network, wherein said plurality of client systems are enabled to communicate with one another through a chat messaging session channel facilitated by a chat messaging server via a network;
   said particular client messaging system further comprising:
   means for participating in a chat messaging facilitated through said chat messaging session channel by receiving from said chat messaging server a plurality of messaging entries as each messaging entry is entered by separate ones of a plurality of separate users participating in said chat messaging session through separate ones of said plurality of client systems; and
   means for receiving, separate from participating in said chat messaging session, a recording of said chat messaging session from said chat messaging server, wherein said plurality of message entries for said chat messaging session are each embedded by a separate digital watermark, wherein each said separate digital watermark identifies a separate origin of each of said plurality of message entries from among separate ones of said plurality of client systems, such that use of said recording of said chat messaging session is traceable according to a watermark.

31. The system for participating in a chat messaging session according to claim 30, said system further comprising:
   means for requesting, from said chat messaging server, said recording of said chat messaging session with each of said plurality of entries embedded by said separate digital watermark.

32. The system for participating in a chat messaging session according to claim 30, said system further comprising:
   means for participating in said chat messaging session by entering a messaging entry for distribution by said chat messaging server to said plurality of client systems through said chat messaging session channel.

33. The system for participating in a chat messaging session according to claim 30, said system further comprising:
   means for participating in said chat messaging session by entering watermarked message entries for distribution by said chat messaging server to said plurality of client systems participating in said chat messaging session.

34. A program for participating in a chat messaging session, residing on a computer usable medium having computer readable program code means, said program comprising:
   means for enabling a client system to communicate via at least one real time chat messaging session channel via a network between at least a selection of a plurality of separate client systems communicatively connected to said network, wherein a chat messaging server facilitates said chat messaging session channel;
   means for enabling participation in a chat messaging session by said client system by receiving from said chat messaging server a plurality of messaging entries as each messaging entry is entered by separate ones of a plurality of separate users participating in said chat messaging session through separate ones of said plurality of client systems; and
   means for enabling reception, separate from participating in said chat messaging session, by said client system of a recording of said chat messaging session from said chat messaging server, wherein said plurality of message entries for said messaging session are each embedded by a separate digital watermark, wherein each said separate digital watermark identifies a separate origin of each of said plurality of message entries from among separate ones of said plurality of client systems, such that use of said recording of said chat messaging session is traceable according to a watermark.

35. The program for participating in a chat messaging session according to claim 34, said program further comprising:
   means for enabling transmission of a request to said chat messaging server for said recording of said chat messaging session with each of said plurality of entries embedded by said separate digital watermark.

36. The program for participating in a chat messaging session according to claim 34, said program further comprising:
   means for participating in said chat messaging session by entering a messaging entry for distribution by said chat messaging server to said plurality of client systems through said chat messaging session channel.

37. The program for participating in a chat messaging session according to claim 34, said program further comprising:
   means for enabling participation in said chat messaging session by entering watermarked message entries for distribution by said chat messaging server to said plurality of client systems participating in said chat messaging session.

* * * * *